United States Patent [19]

Beikirch

[11] Patent Number: 5,043,827
[45] Date of Patent: Aug. 27, 1991

[54] COMBINED ASYNCHRONOUS-SYNCHRONOUS DOCUMENT SCANNER

[75] Inventor: Thomas R. Beikirch, Webster, N.Y.

[73] Assignee: Xerox Corporation, Stamford, Conn.

[21] Appl. No.: 389,249

[22] Filed: Aug. 3, 1989

[51] Int. Cl.$^5$ .............................................. H04N 3/14
[52] U.S. Cl. .................................... 358/471; 358/431
[58] Field of Search ............. 358/471, 474, 482, 483, 358/486, 493, 494, 497, 212, 213.11, 431; 250/578.1, 235, 428, 208.02

[56] References Cited

U.S. PATENT DOCUMENTS

| | | | |
|---|---|---|---|
| 4,511,989 | 4/1985 | Sakamoto | 364/723 |
| 4,591,727 | 5/1986 | Gaebelein et al. | 250/578 |
| 4,614,977 | 9/1986 | Kawahara et al. | 358/428 |
| 4,644,409 | 2/1987 | Fuchs | 358/256 |
| 4,651,223 | 3/1987 | Sasaki et al. | 358/284 |
| 4,680,720 | 7/1987 | Yoshii et al. | 364/521 |
| 4,710,817 | 12/1987 | Ando | 358/213.11 |
| 4,712,141 | 12/1987 | Tomohisa et al. | 358/280 |
| 4,771,333 | 9/1988 | Michaels | 358/213.29 |
| 4,875,099 | 10/1989 | Sakai et al. | 358/213.11 |
| 4,878,119 | 10/1989 | Beikirch et al. | 358/471 |

Primary Examiner—Edward L. Coles, Sr.
Assistant Examiner—Jerome Grant, II
Attorney, Agent, or Firm—Frederick E. McMullen

[57] ABSTRACT

An asynchronous document scanner with one dimensional scanning array, a movable scan carriage supporting the array for scanning movement, a variable interpolator for interpolating partial lines of image signals from the array with preceding lines of image signals to provide a composite image signal lines, and a control responsive to the timing of the start integration signal to the array to vary the interpolation coefficient of the interpolator.

8 Claims, 6 Drawing Sheets

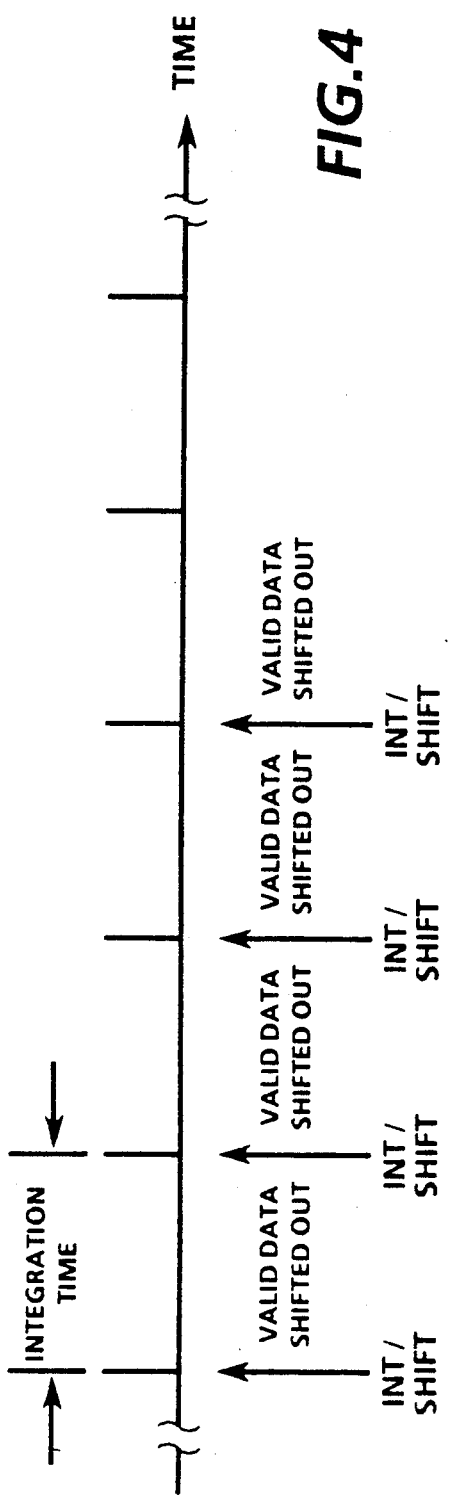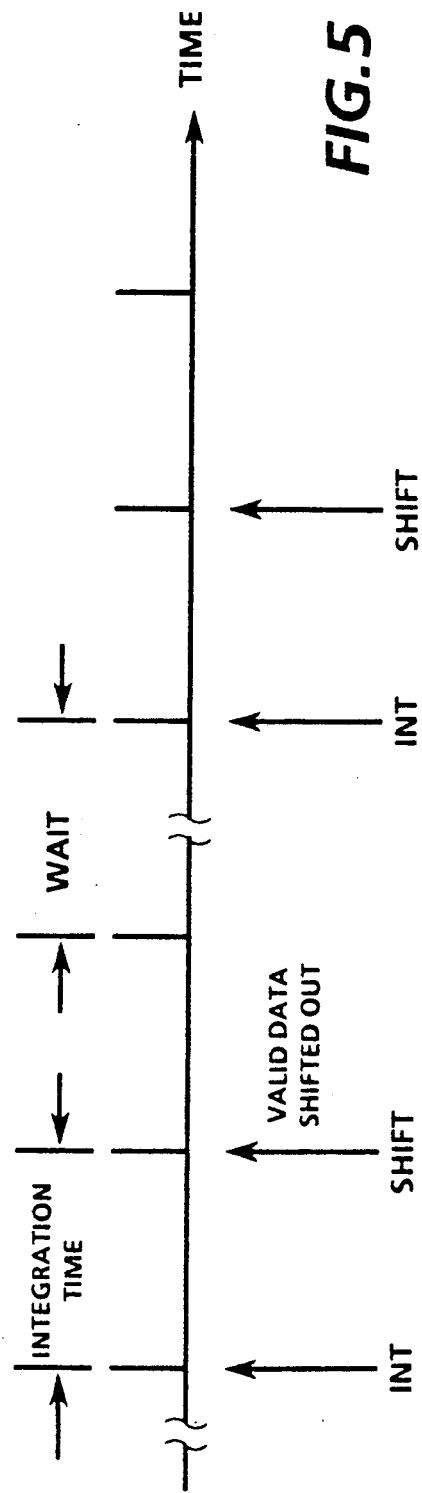

COMBINED ASYNCHRONOUS-SYNCHRONOUS DOCUMENT SCANNER

The invention relates to document scanners, and more particularly, to combined asynchronous-synchronous document scanners.

When scanning documents, the document being scanned is typically moved in one dimension, called the slow scan direction, by a document transport mechanism past a one dimensional scanning device which scans the image. A one dimensional imaging device of this type can only be operated "synchronously". Typically, the scanning device used is a charge coupled device (CCD) oriented orthogonal to the direction of motion of the document.

Present day document scanners fall into one of two types, asynchronous or synchronous. In a synchronous document scanner, the image signals generated by the scanning device are removed at the rate at which the scanning device generates the image signals. That is, the downstream image signal processing circuitry must pass the image data along to the host at the same rate as the image data is generated and the host must keep up with the rate. If the downstream image processing circuitry cannot receive image data at the rate at which the data is generated, the image data is lost, since the one dimensional scanning device cannot speed up or slow down.

If a document scanner supplies image data to the host at a rate determined by the host, this type of scanner is said to be asynchronous. Typically, there are two types of asynchronous operation. In one, a very large first in first out (FIFO) buffer is inserted in the data path to allow the one dimensional scanning device to be run synchronously. However, this method can entail high cost since the size of the FIFO buffer required to store the image data, particularly when the host slows down or stops, is large. In the other type of asynchronous operation, integration is started 'on demand' when data is required by the host. The single line of image data generated can then be stored in a small FIFO buffer to provide byte asynchronous operation with the host. However, the fastest possible rate in this type of operation is only half that of a synchronous scanner since the one dimensional scanning device must first integrate before the image signals can be shifted out of the scanning device to the downstream signal processing circuitry and the host. Since the shift out time is equal to the integration time, it necessarily takes at least twice as long to obtain a line of image data in an asynchronous document scanner.

It would be desirable if the advantages of both scanner types, that is, the high speed of the synchronous scanner and the minimal memory of the asynchronous scanner, could be combined into one scanner.

Referring to the prior art, U.S. Pat. No. 4,591,727 to Gaebelein et al discloses a solid state scanner with variable speed transport. In Gaebelein et al, the integration period of the detector array is varied by varying the clock rate at which the array is driven in accommodation of the speed of the document transport while correcting the signals produced by multiplying the signal output by a correction factor which is chosen based on the frequency of the clock signals. U.S. Pat. No. 4,511,989 to Sakamoto discloses a multi-dimensional interpolation system for a color scanner, while U.S. Pat. No. 4,712,141 to Tomohisa et al discloses an interpolation method in which pairs of pixels are generated using an arithmetic circuit to interpolate, and U.S. Pat. No. 4,680,720 to Yoshii et al discloses a system for effecting dot interpolation from pattern data stored in memory. Further, U.S. Pat. No. 4,644,409 to Fuchs discloses a system employing dual scanning devices for input and output, with selectable scanning resolutions for determining the ratio of output resolution to input resolution, while U.S. Pat. No. 4,651,223 to Sasaki et al discloses a recorder incorporating magnification changing means allowing the number of pixels output to the print unit for printing to be different from the number of pixels input.

In contrast to the prior art, the present invention provides a document scanner operative either asynchronously or in a combined asynchronous and synchronous scanning mode to provide lines of image data to a work station which comprises: an array for scanning image bearing documents line by line to provide image signals representative of the image content of the document line scanned, the array including a plurality of image detectors for generating image signals during an integration interval and shift register means for receiving the image signals from the detectors, the shift register means outputting the image signals in serial form during an image signal shift period; the scanner when operating asynchronously having a variable start of integration signal which may result in at least a part of the line of image signals produced by the array being input to the shift register means prior to clearance of the preceding line of image signals from the shift register means; variable interpolator means for interpolating the line of image signals with the preceding line of image signals to provide a composite line of image signals for the workstation; and control means for establishing the interpolation coefficient for the variable interpolator means in response to timing of the integration signal.

IN THE DRAWINGS

FIG. 4 is a graphical representation depicting the scanner operating in the full synchronous mode;

FIG. 5 is a graphical representation depicting the scanner operating in the asynchronous mode;

Figure 1:
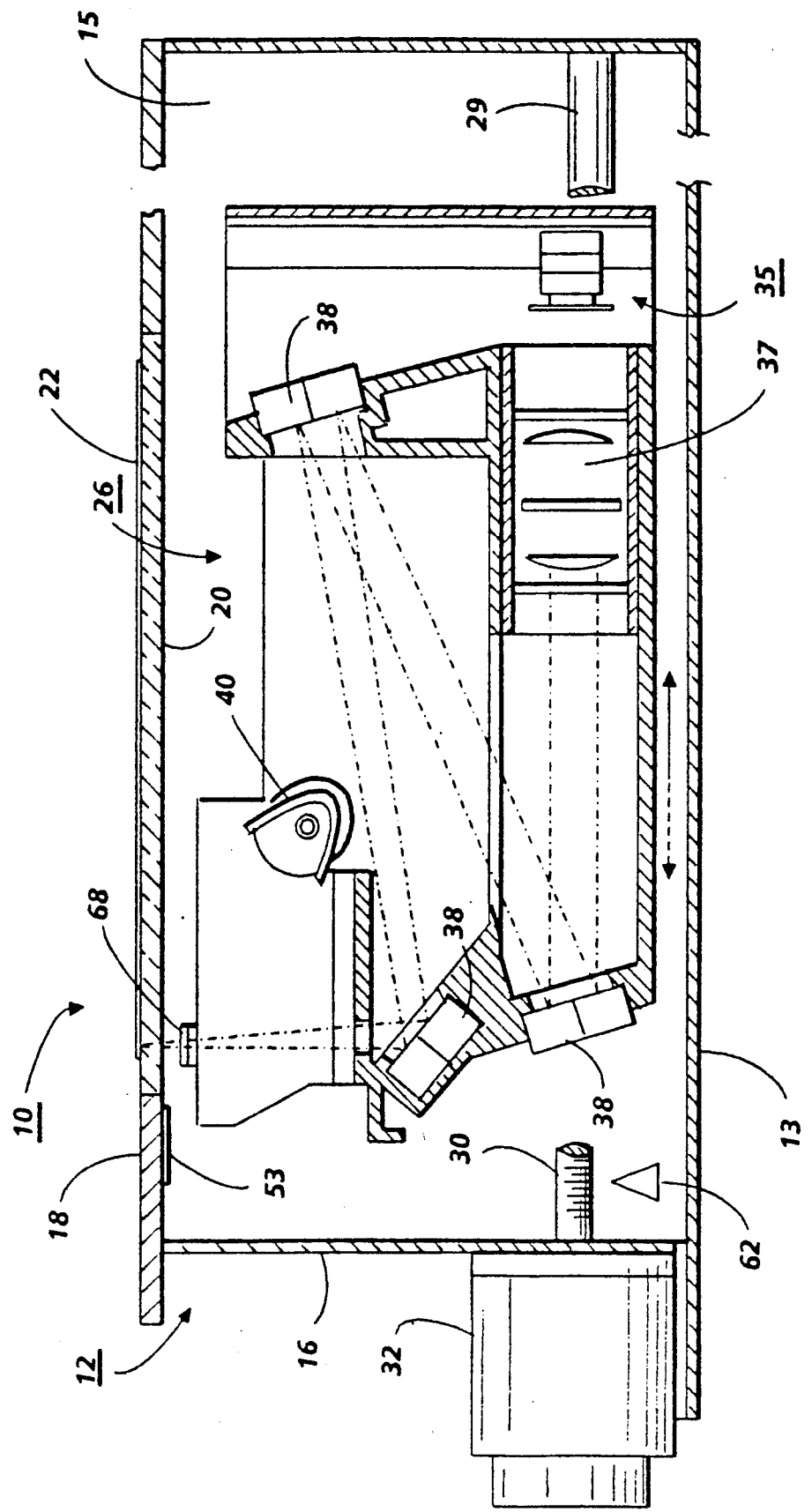
FIG. 1 is a schematic view of the asynchronous or combination asynchronous-synchronous document scanner of the present invention.
Figure 2:
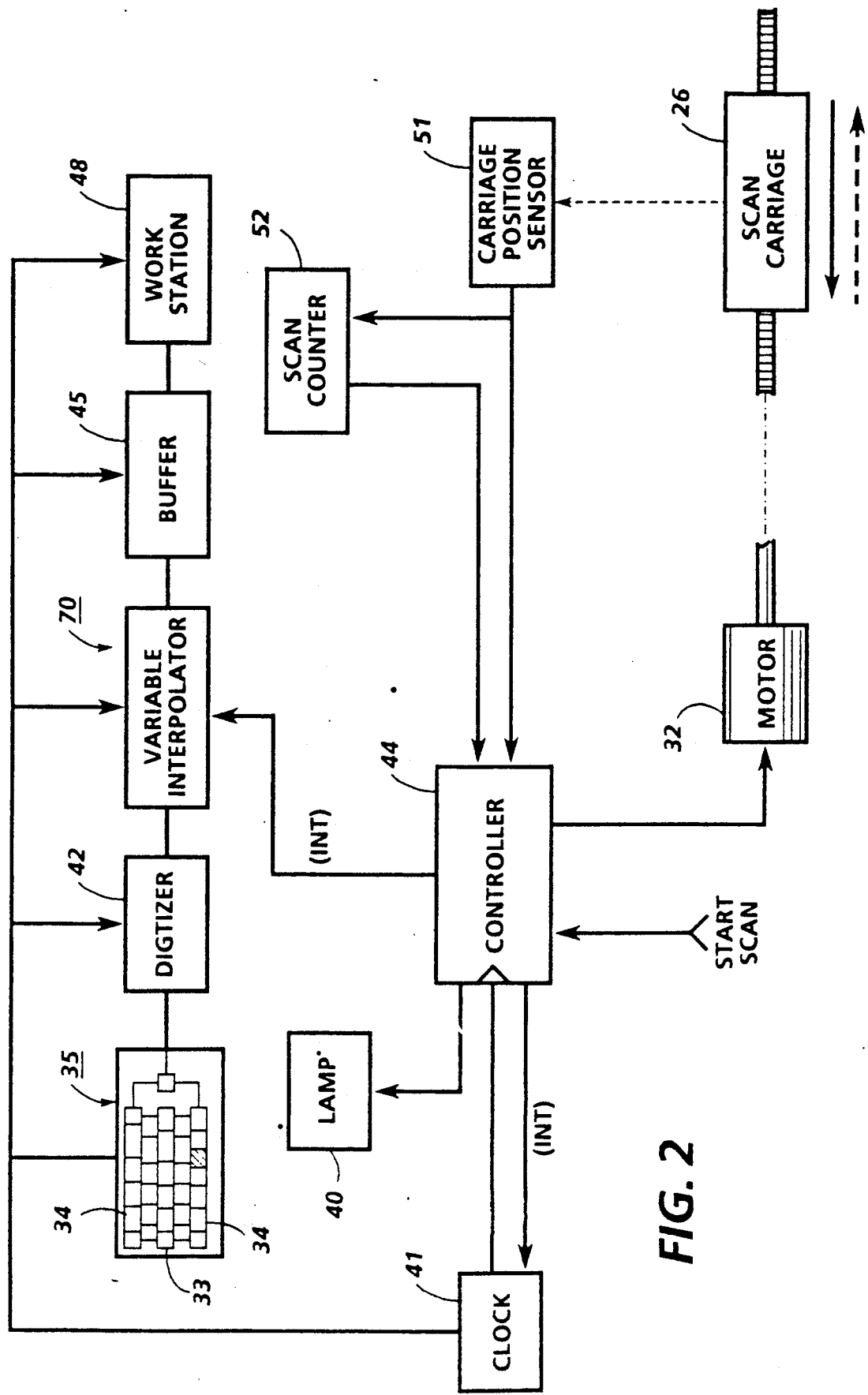
FIG. 2 is a schematic block view showing the principal operating components of the scanner shown in FIG. 1.
Figure 3:
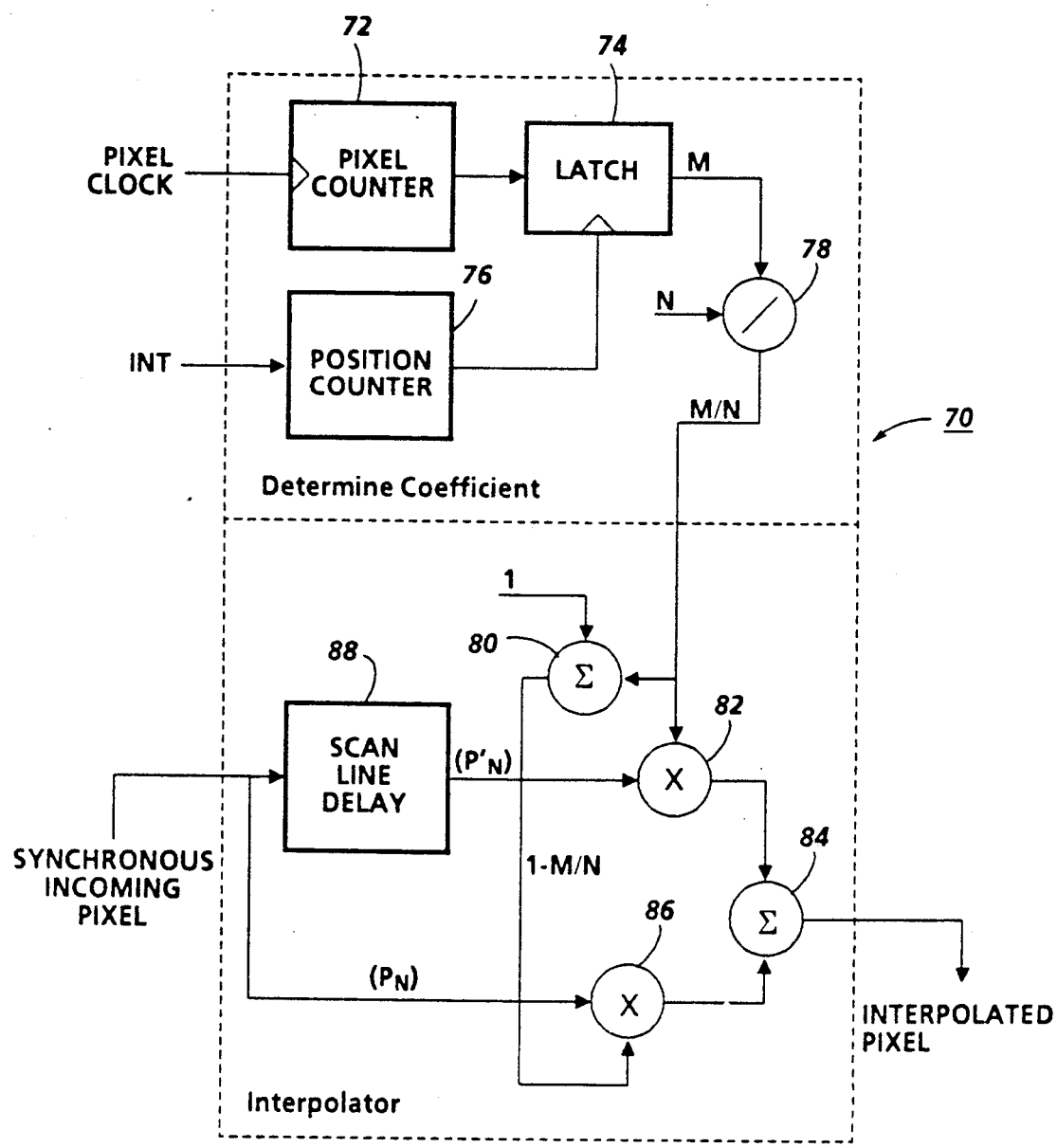
FIG. 3 is a schematic view showing details of the variable interpolator shown in FIG. 2.

Referring to FIGS. 1-3, there is shown an exemplary document scanner, designated generally by the numeral 10, of the type adapted for asynchronous or combined asynchronous-synchronous operation in accordance with the teachings of the present invention. Scanner 10 includes a housing 12 with base 13, sides 15, and ends 16. The top 18 of housing 12 incorporates a generally rectangular transparent platen 20. Platen 20 is formed from a relatively larger piece of transparent material, typically glass, having an opaque border delineating a generally rectangular viewing window sized to accommodate the largest document original 22 to be scanned. As will be understood, a document 22 to be scanned is located either manually or by a suitable automatic document handler or feeder (not shown) on platen 20 for scanning. A scan carriage 26 is movably supported within housing 12 on base 13 for reciprocable movement in the slow scan direction underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a scan or pre-scan direction as shown by the dotted line and solid line arrows in drawing FIG. 1 respectively.

A one-dimensional linear scanning array 35 such as a CCD is suitably mounted on scan carriage 26 in predetermined operative relation with platen 20 so as to scan the document resting thereon. Array 35, which is disposed so that the scan axis (designated the fast scan direction) is substantially perpendicular to the direction of movement of carriage 26 on rails 29, has a linear row of photosensitive detectors 33 flanked by parallel in-serial out shift registers 34. A suitable optical system is provided for transmitting light rays from the document line being scanned to array 35, the optical system being exemplified by lens 37, mirrors 38, and lamp 40. Lens 37 and mirrors 38 cooperate to focus array 35 on a line-like area extending across the width of platen 20 and perpendicular to the direction of movement of carriage 26 while light from lamp 40 illuminates the line-like area on which array 35 is focused.

A suitable clock 41 provides clock signals for operating the system including driving array 35 through timed scan cycles. Clock signals from pixel clock 41 additionally drive the pixel counter 72 of a variable interpolator 70 which counts the number of pixels output in each image line. The output of pixel counter 72 is fed to latch 74.

Each scan cycle consists of an integration period during which the photosensitive detectors 33 of array 35 obtain signals reflecting the image density of the line viewed by the array, a transfer cycle during which the image signals are transferred in parallel from detector 33 to shift register 34, and a shift cycle during which the image signals in shift registers 34 are shifted serially out of the shift registers to a variable interpolator 70.

Each time scan carriage 26 moves to the next image line in response to a demand for image data by workstation 48, controller 44 outputs an integration signal (INT) to clock 41 to start a scan cycle. Where the current scan cycle is out of synchronism with the integration signal (INT), the integration signal effectively resets the timing of the scan cycle. The integration signal (INT) is also input to position counter 76 of interpolator 70 to actuate latch 74 and latch the count on pixel counter 72 at the instant the integration signal is received.

In the embodiment shown and described, scanner 10 operates in a combined asynchronous/synchronous manner where the scanning speed of scan carriage 26 varies from a low at startup to a maximum as scan carriage 26 accelerates at start of scan from a stop up to the maximum scanning speed of which scanner 10 is capable. In the acceleration period as well as at maximum scanning speed, scanner 10 scans the document original on platen 20 and provides image data to workstation 48 on demand each time array 35 is moved one line. As will be understood, scanner 10 may operate both asynchronously at a variable scanning rate during acceleration and synchronously at a constant scanning rate in response to the demand for image data by workstation 48. The determination of whether scanner 10 is in the asynchronous or synchronous mode is dependent on the scan speed of carriage 26.

Referring now to FIG. 4, when scanner 10 is operating in the synchronous mode at the scanner maximum scanning speed, the rate at which the image data generated must be removed is equal to the rate at which array 35 generates the image data. In this case, the scan cycles once established, are and remain synchronous.

Figure 6:
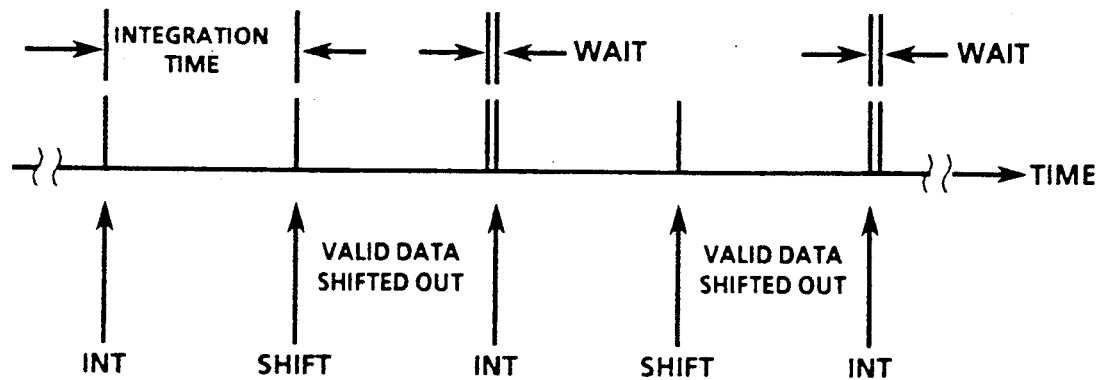
FIG. 6 is a graphical representation depicting the scanner operating in the fastest asynchronous mode.

When scanner 10 operates in the asynchronous mode, as shown in FIGS. 5 and 6, the rate at which image data is generated normally varies with the speed at which scan carriage 26 is currently moving. As will be understood, the speed of scan carriage 26 varies from zero at the instant scanning starts up to the maximum scanning speed that asynchronous operation allows. As a result, the rate at which the image data is output will vary and the scan cycles may not be synchronous with one another.

It will be understood that where the next scan cycle is commenced before the preceding scan cycle is completed, the image signals from the preceding line are not completely shifted out of the array shift registers. As a result, image signals from the new line are intermixed with leftover signals from the preceding line, leading to image signal distortion in the overlapping areas.

Figure 8:
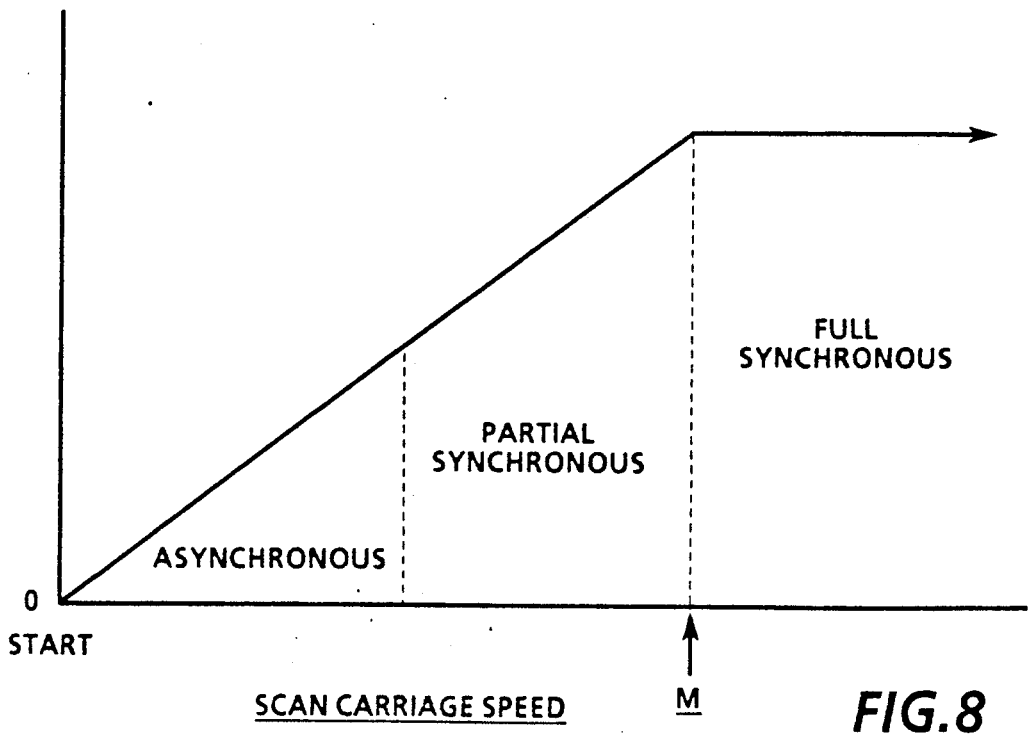
FIG. 8 is a graph depicting the relation between scan carriage speed and scanner operating modes.
Figure 7:
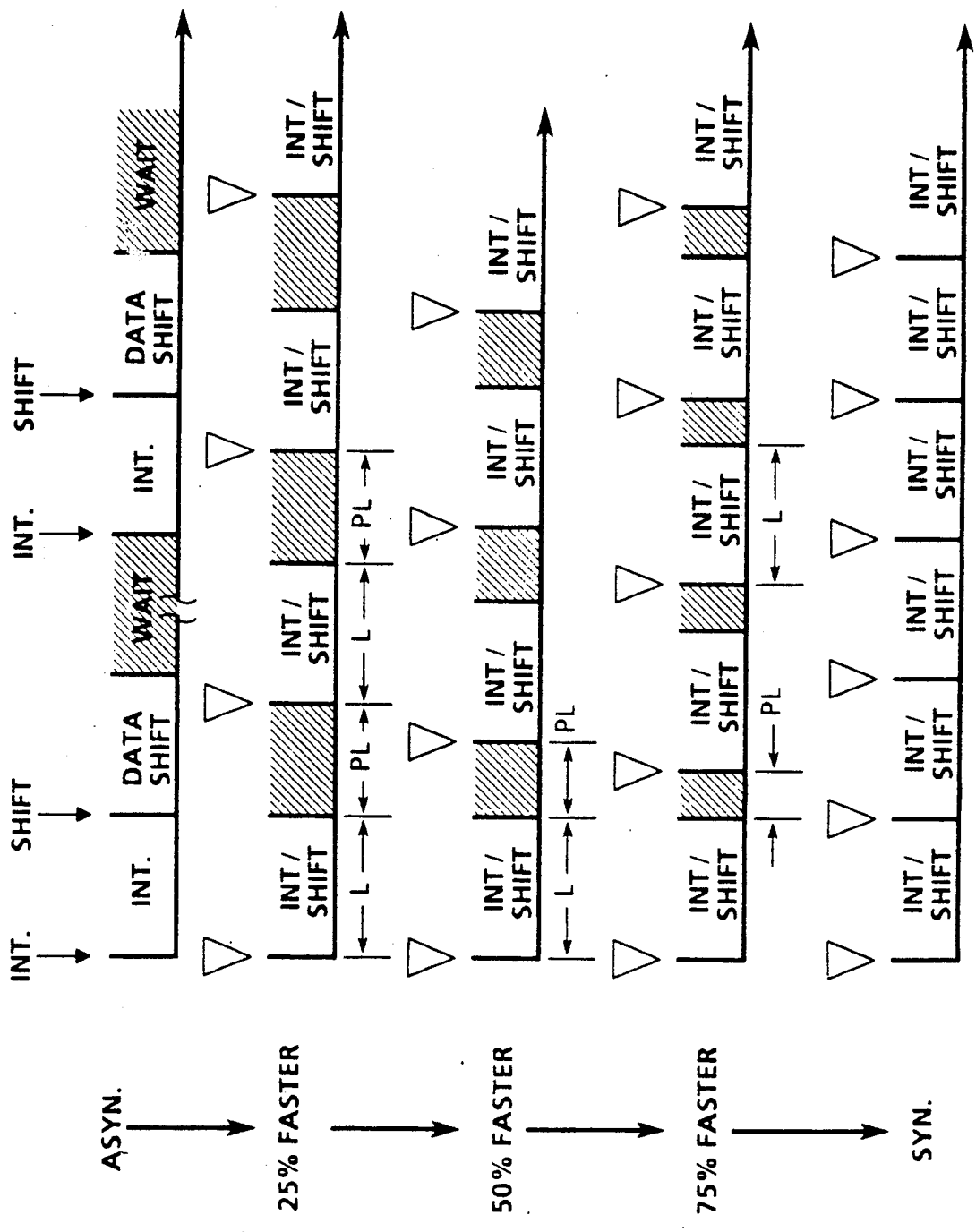
FIG. 7 is a graphical representation depicting the partial synchronous mode at various exemplary speeds ranging from asynchronous mode to full synchronous mode.

As can be seen in FIGS. 7 and 8, where scan carriage 26 has reached the maximum scan speed possible in the asynchronous mode, i.e., a speed slightly less than one-half the speed required for full synchronous operation, there remains an interval between maximum asynchronous and full synchronous modes where the scan carriage is moving at a speed too fast for asynchronous scanning and too slow for full synchronous scanning. In this interval, the scanner 10 operates in a partial synchronous mode as the scan carriage accelerates up to the maximum scanning speed required for synchronous operation. During the partial synchronous mode, a varying degree of distortion of the image data can result since there is insufficient time to fully clear the array shift registers before the next integration signal (INT) arrives. As a result, image signals from the partial integration period that occur are combined with the remaining uncleared image signals from the preceding integration period.

It would be advantageous if both asynchronous and synchronous operation could be combined without distortion. However, this is not possible in the absence of the ability of scan carriage 26 to change speed instantaneously.

To overcome possible image signal distortion, variable interpolator 70 is provided. Interpolator 70 employs a variable interpolation coefficient that is established at the instant interpolation begins, the particular interpolation coefficient used being a function of the point in the current scan cycle where the current scan cycle is interrupted and the new scan cycle is started in response to an integration signal (INT).

Referring particularly to FIG. 3, the count output M on latch 74 of interpolator 70 is fed to a suitable divide-by-N circuit 78 where the count is divided by a count N representing the total number of pixels in the scan line to provide the specific interpolation coefficient M/N for the line of image signals being output. The new interpolation coefficient M/N is fed to a subtracting circuit 80 where the coefficient M/N is subtracted from one to provide an inverse interpolation coefficient 1−M/N.

The image signals (P′$_N$) from the preceding line are held in scan line delay buffer 88. The signals from the preceding line output from buffer 88 are multiplied by interpolation coefficient M/N in multiplier 82 and the result fed to one input of differencing circuit 84. The corresponding pixel (P$_N$) in the line of image signals currently output by array 33 is multiplied by the inverse interpolation coefficient 1−M/N by multiplier 86, and the result fed to a second input of differencing circuit 84. Circuit 84 subtracts the two interpolated values from one another to provide the image signal representation for the pixel being processed.

Referring to FIG. 2, the image signals from array 35 are input to digitizer 42 where they are converted to digital format. From digitizer 42, the image signals are output to interpolator 70 and from interpolator 70 to line buffer 45 where the processed image signals are held pending output to workstation 42.

A suitable carriage position sensor 51 is provided to track movement of carriage 26. On movement of carriage 26 with array 35 through a distance equal to one scan line, sensor 51 outputs a signal to controller 44 which responds by sending the integration signal (INT) to pixel clock 41 in effect requesting output of the next valid line of image signals. A bi-directional scan counter 52, which is preset to a count equal to the total number of scan lines required to scan the operating length of platen 20, is provided. Counter 52 is indexed by 1 each time carriage 26 moves one scan line as sensed by position sensor 51. Control signals output by counter 52 are fed to controller 44 to regulate the start-of-scan, end-of-scan, and the direction of scanning movement of scan carriage 26.

While scanner 10 has been shown and described as operating in a combined asynchronous/synchronous manner, it will be understood that scanner 10 may be operated solely in an asynchronous manner.

While an exemplary scanner 10 has been shown and described, other scanner types and designs may be envisioned.

While the invention has been described with reference to the structure disclosed, it is not confined to the details set forth, but is intended to cover such modifications or changes as may come within the scope of the following claims.

I claim:

1. In a document scanner operative either asynchronously or in a combined asynchronous and synchronous manner to scan image bearing documents and provide lines of image data to a work station, the combination of:

a) a one dimensional array for scanning image bearing documents line by line to provide image signals representative of the image content of each image line scanned,
said array including a plurality of image detectors for generating image signals in response to integration signals and shift register means for receiving said image signals from said detectors, said shift register means outputting said image signals in serial form to said workstation;

b) said integration signals being input at random times when said scanner is operating asynchronously resulting in at least a part of the line of image signals produced by said array being received by said shift register means prior to output of the last image signal from the preceding line of image signals from said shift register means;

c) variable interpolator means for interpolating said line of image signals with said preceding line of image signals to provide a composite line of image signals for said workstation; and d) control means for establishing the interpolation coefficient for said variable interpolator means in response to timing of said integration signal.

2. In a document scanner operative either asynchronously or in a combined asynchronous and synchronous manner to scan image bearing documents and provide lines of image data to a work station, the combination of:

a) a one dimensional array for scanning image bearing documents line by line to provide image signals representative of the image content of each image line scanned,
said array including a plurality of image detectors for generating image signals in response to integration signals and shift register means for receiving said image signals from said detectors, said shift register means outputting said image signals in serial form to said workstation;

b) said integration signals being input at random times when said scanner is operating asynchronously resulting in at least a part of the line of image signals produced by said array being received by said shift register means prior to output of the last image signal from the preceding line of image signals from said shift register means;

c) variable interpolator means for interpolating said line of image signals with said preceding line of image signals to provide a composite line of image signals for said workstation; and d) control means for establishing the interpolation coefficient for said variable interpolator means in response to timing of said integration signal; said variable interpolator means including e) counting means for monitoring the number of image signals in each scan line;

f) position counting means for generating a control signal in response to movement of said scan carriage from one scan line to the next scan line;

g) latch means for recording the image signal count on said counting means in response to said control signal from said position counting means;

h) first means for dividing the image signal count in said latch means by the total count of image signals in said scan line to provide a first interpolating adjusting factor;

i) image signal delay means for holding said preceding scan line of image signals as said image signals are output by said array;

k) differencing means for subtracting said first adjusting factor from unity to provide a second adjusting factor;

l) first multiplier means for multiplying each image signal output by said image signal delay means by said first adjusting factor to provide first partially interpolated image signals;

m) second multiplier means for multiplying each image signal output by said array by said second adjusting factor to provide second partially interpolated image signals; and n) means for differencing said first and second partially interpolated image signals to provide image signals for output to said workstation.

3. The document scanner according to claim 1 including buffer means for temporarily holding said image signals output by said variable interpolator means pending output to said workstation.

4. In a variable speed document scanner operative asynchronously to provide lines of image data to a work station, the combination of:
   a) at least one array for scanning image bearing documents line by line to provide image signals representative of the image content of the document line scanned,
   said array including a plurality of image detectors for generating image signals and shift register means for receiving said image signals from said detectors;
   b) clock means for repeatedly clocking said array in a predetermined timed cycle, each of said cycles including an integration interval, transfer interval for parallel transfer of image signals from said detectors to said shift register means, and a shift interval during which image signals are serially shifted from said shift register means to clear said shift register means for the next line of image signals, the integration interval for each image line overlapping the shift interval of the preceding line;
   c) means responsive to a demand by said workstation for image signals for intervening in said cycle and generating a start of integration signal whereby to reset said timed cycle;
   d) a variable rate interpolator for receiving said lines of image signals from said array and interpolating each of said lines of image signals together with the preceding line of image signals to provide interpolated lines of image signals for said workstation; and
   e) means for adjusting the interpolation coefficient of said interpolator means in response to said integration signal by a factor determined by comparing the number of image signals scanned at the time said start of scan signal is received with the total number of image signals in a line.

5. The document scanner according to claim 4 including delay means for temporarily holding said preceding line of image signals for use by said interpolator.

6. Apparatus to provide a combined asynchronous and synchronous scanner while neutralizing the variable delay interval that occurs when operating in said asynchronous mode, said scanner providing image data to a work station, said apparatus comprising in combination:
   a) at least one array for scanning an image bearing document line by line to provide image signals representative of the image content of the line scanned,
   said array including a plurality of image detectors for generating lines of image signals during an integration interval and shift register means for receiving said image signals from said detectors, said shift register means outputting said image signals in serial form during an image signal shift period;
   b) image signal processing means for processing image signals output by said array to provide image data;
   c) interpolating means for combining with the preceding line of image signals additional image signals generated by said array during said delay interval to provide a composite line of image signals; and
   d) control means for regulating said interpolating means in response to the instantaneous scanning rate of said scanner during said asynchronous mode.

7. Apparatus according to claim 6 including memory means for temporarily holding said preceding line of image signals whereby said preceding line is input to said interpolating means concurrently with said additional image signals.

8. Means to permit the relatively slower scan rate associated with an asynchronous scanner to be increased up to the higher rate associated with a synchronous scanner to thereby obtain the advantages of both types without the disadvantages of either, in which the scanner includes a one dimensional array; image signal processing means for processing the image signals output by said array to provide image data; and a transport mechanism for moving one of said array and the image bearing document being scanned to establish relative scanning movement therebetween, the improvement comprising:
   a) a variable rate interpolator in the data path downstream of said image signal processing means for varying the resolution of said image data; and
   b) control means responsive to the velocity of said transport mechanism for adjusting the interpolation rate of said interpolator whereby to control and maintain image data resolution substantially constant as the velocity of said transport mechanism changes during asynchronous scanning.

* * * * *